United States Patent
Bae et al.

(10) Patent No.: US 11,962,545 B2
(45) Date of Patent: Apr. 16, 2024

(54) METHOD AND DEVICE FOR PROVIDING CHATBOT PARTICIPATING CHAT SERVICE

(71) Applicant: SAMSUNG ELECTRONICS CO., LTD., Suwon-si (KR)

(72) Inventors: Heejeong Bae, Suwon-si (KR); Yuri Min, Suwon-si (KR); Eunhee Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/952,959

(22) Filed: Sep. 26, 2022

(65) Prior Publication Data

US 2023/0208785 A1    Jun. 29, 2023

Related U.S. Application Data

(63) Continuation of application No. PCT/KR2022/013218, filed on Sep. 2, 2022.

(30) Foreign Application Priority Data

Dec. 27, 2021  (KR) .................. 10-2021-0188441

(51) Int. Cl.
- *H04L 51/02* (2022.01)
- *H04L 12/18* (2006.01)
- *H04L 51/04* (2022.01)

(52) U.S. Cl.
CPC .......... *H04L 51/02* (2013.01); *H04L 12/1822* (2013.01); *H04L 51/04* (2013.01)

(58) Field of Classification Search
CPC ...... H04L 51/02; H04L 51/04; H04L 12/1822
See application file for complete search history.

(56) References Cited

U.S. PATENT DOCUMENTS 9,288,554 B2   3/2016  Lee et al.
9,762,943 B2   9/2017  Uhrich
(Continued)

FOREIGN PATENT DOCUMENTS

CN   107925780 A   4/2018
CN   111295679 A   6/2020
(Continued)

OTHER PUBLICATIONS

Search Report and Written Opinion dated Dec. 16, 2022 issued in International Patent Application No. PCT/KR2022/013218.

*Primary Examiner* — Thomas J Dailey
(74) *Attorney, Agent, or Firm* — Nixon & Vanderhye P.C.

(57) ABSTRACT

Various embodiments of the disclosure relate to a method and device for providing a chatbot participating chat service to a chat room corresponding to a real-time broadcast channel on a display device and providing a chatbot participating chat service based on a user chat history, a chatbot chat history, or real-time broadcast channel content in the number of chatbots determined based on a user input or the type of the real-time broadcast channel. To that end, a method may include: receiving a real-time broadcast channel, obtaining an input including at least one of a chatbot chat mode and a number of chatbots in a chat room corresponding to the real-time broadcast channel, and determining the number of chatbots in the chat room corresponding to the real-time broadcast channel based on the input.

18 Claims, 13 Drawing Sheets

(56) References Cited

U.S. PATENT DOCUMENTS

| | | | |
|---|---|---|---|
| 10,187,337 B2 * | 1/2019 | Smullen | H04L 67/306 |
| 10,511,889 B2 | 12/2019 | Dietz | |
| 11,018,998 B1 | 5/2021 | Knas et al. | |
| 2017/0142489 A1 | 5/2017 | DeWeese et al. | |
| 2017/0324867 A1 * | 11/2017 | Tamblyn | H04L 65/1093 |
| 2019/0007709 A1 | 1/2019 | Oh et al. | |
| 2019/0297032 A1 * | 9/2019 | Zhang | H04L 51/02 |
| 2020/0154170 A1 * | 5/2020 | Wu | H04N 21/4532 |
| 2021/0099759 A1 | 4/2021 | Armstrong et al. | |
| 2021/0165846 A1 * | 6/2021 | Kitoh | H04L 51/02 |
| 2021/0409352 A1 * | 12/2021 | Arunachalam | H04L 63/102 |
| 2022/0116485 A1 * | 4/2022 | Gandhi | H04L 51/216 |
| 2022/0210098 A1 * | 6/2022 | Zhang | G06F 16/3329 |
| 2022/0222360 A1 * | 7/2022 | Kawase | G06F 21/31 |
| 2022/0382988 A1 * | 12/2022 | Frost | G06N 5/01 |

FOREIGN PATENT DOCUMENTS

| | | |
|---|---|---|
| CN | 105975622 | 12/2020 |
| CN | 113727124 B | 9/2022 |
| JP | 6166234 | 7/2017 |
| JP | 6760676 | 9/2020 |
| KR | 10-2014-0064761 A | 5/2014 |
| KR | 10-2014-0126046 | 10/2014 |
| KR | 10-1731867 | 5/2017 |
| KR | 101886628 | 9/2018 |
| KR | 10-2019-0064313 A | 6/2019 |
| KR | 10-2019-0100512 | 8/2019 |
| KR | 10-2021-0152790 | 12/2021 |
| WO | WO 2019/204540 A1 | 10/2019 |

* cited by examiner

METHOD AND DEVICE FOR PROVIDING CHATBOT PARTICIPATING CHAT SERVICE

CROSS REFERENCE TO RELATED APPLICATIONS

This application is a continuation application of International Application No. PCT/KR2022/013218 designating the United States, filed on Sep. 2, 2022, in the Korean Intellectual Property Receiving Office and claims priority from Korean Patent Application No. 10-2021-0188441, filed on Dec. 27, 2021, in the Korean Intellectual Property Office, the disclosures of which are hereby incorporated by reference herein in their entireties.

BACKGROUND

Field

The disclosure relates to a method and device for providing a chatbot participating chat service to a chat room corresponding to a real-time broadcast channel on a display device and providing a chatbot participating chat service based on a user chat history, a chatbot chat history, or real-time broadcast channel content in the number of chatbots determined based on a user input or the type of the real-time broadcast channel.

Description of Related Art

As network technology and server signal processing technology develop, real-time online chat services are being provided. Further, as Internet video services spread rapidly, a service in which a large number of viewers participate in chatting together in a chat room created by a video content service operator while playing video content on a PC or mobile device has also appeared.

Meanwhile, as the demand for various functions and practicality of smart TVs increases, there is ongoing vigorous research and development efforts at smart TVs with various functions, such as providing various types of information as well as displaying broadcasts.

When watching a real-time broadcast channel that is not provided with a chat room on a display device, such as a TV, the user may have limited options for chatting experience. Further, even when a chat room corresponding to a real-time broadcast channel is provided, the user's chatting experience may be limited if there are few chat room participants or if chatting is not active.

SUMMARY

Embodiments of the disclosure provide a method and device for providing a chatbot participating chat service to a chat room corresponding to a real-time broadcast channel on a display device and providing a chatbot participating chat service based on a user chat history, a chatbot chat history, or real-time broadcast channel content in the number of chatbots determined based on a user input or the type of the real-time broadcast channel.

According to an example embodiment of the disclosure, a display device may comprise: a display, a memory storing at least one instruction, a tuner unit comprising a tuner configured to receive a real-time broadcast channel, a user interface configured to receive an input including at least one of a chatbot chat mode and a number of chatbots in a chat room corresponding to the real-time broadcast channel, and one or more processors electrically connected with the display, the memory, the tuner unit, and the user interface and configured to execute the at least one instruction. The one or more processors may be configured to determine the number of chatbots in the chat room corresponding to the real-time broadcast channel based on the input.

According to an example embodiment of the disclosure, a method for providing a chatbot participating chat service may comprise: receiving a real-time broadcast channel, receiving an input including at least one of a chatbot chat mode and a number of chatbots in a chat room corresponding to the real-time broadcast channel, and determining the number of chatbots in the chat room corresponding to the real-time broadcast channel based on the input.

According to various example embodiments of the disclosure, it is possible to provide a chat room corresponding to a real-time broadcast channel while watching a broadcast channel in real-time on a display device. Thus, it is possible to provide the user with an experience of chatting while watching broadcast channels in real-time.

According to various example embodiments of the disclosure, although viewing real-time broadcast channels provided with chat rooms by the service operator, if there are few chat room participants or chat is not active, the display device may provide a chatbot participating chat service, thereby providing the user with a right of choice for a chat experience.

According to various example embodiments of the disclosure, although viewing real-time broadcast channels provided with chat rooms by the service operator, if there are few chat room participants or chat is not active, a server device may automatically provide a chatbot participating chat service to all of the display devices participating in the chat rooms, thereby providing a meaningful, extended chat experience as well as real-time broadcast channel viewing, to the user group viewing the real-time broadcast channels.

Effects of the disclosure are not limited to the foregoing, and other unmentioned effects would be apparent to one of ordinary skill in the art from the following description.

BRIEF DESCRIPTION OF THE DRAWINGS

The above and other aspects, features, and advantages of certain embodiments of the present disclosure will be more apparent from the following description, taken in conjunction with the accompanying drawings, in which.

DETAILED DESCRIPTION

Figure 1:
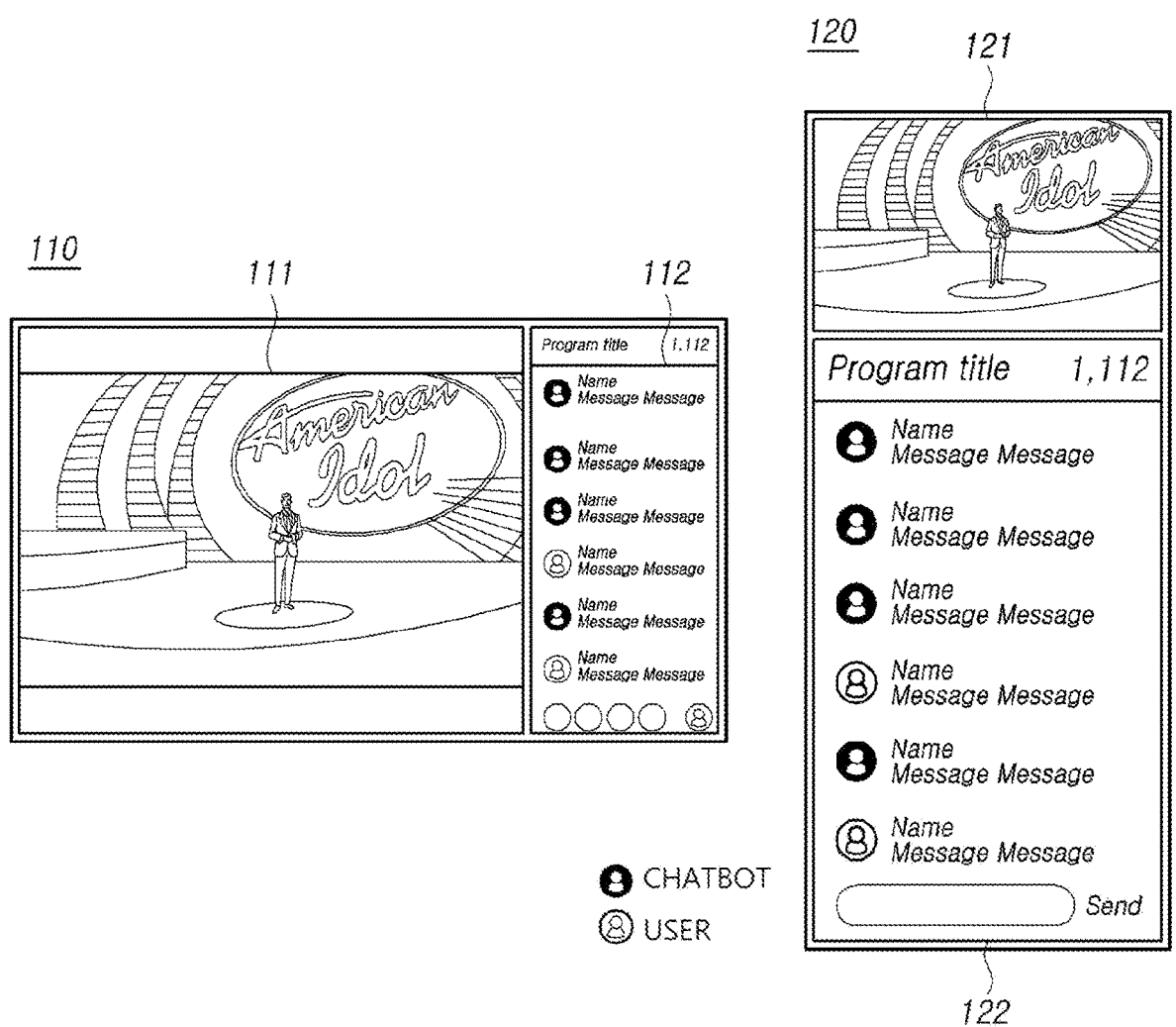
FIG. 1 is a diagram illustrating an example output screen of a display device providing a chatbot participating chat service according to various embodiments.

In describing various example embodiments of the disclosure, common terms widely used as possible have been chosen considering functions in the disclosure, but the terms may be varied depending on the intent of one of ordinary skill in the art or case laws or the advent of new technologies. In certain cases, some terms may be arbitrarily selected, and in such case, their definitions may be given in the relevant parts of the disclosure. Accordingly, the terms used herein should be determined based on their meanings and the overall disclosure, rather than by the terms themselves.

When an element "includes" another element, the element may further include the other element, rather excluding the other element, unless particularly stated otherwise. Further, the terms "unit," "module," or "part" as used herein denote a unit processing at least one function or operation, and a unit, module, or part may be implemented in hardware, software, or a combination thereof.

Embodiments of the disclosure are now described with reference to the accompanying drawings in in greater detail. However, the disclosure may be implemented in other various forms and is not limited to the embodiments set forth herein. In the drawings, the same reference numerals refer to the same elements, and the size of each component in the drawings may be exaggerated for clarity of description.

FIG. 1 is a diagram illustrating an example output screen of a display device providing a chatbot participating chat service according to various embodiments.

Referring to FIG. 1, display devices 110 and 120 may provide chat rooms 112 and 122 corresponding to real-time broadcast channels 111 and 121 while simultaneously viewing the broadcast channels in real-time.

According to an embodiment, for the real-time broadcast channels 111 and 121 which are provided with no chat room by the service operator, the display devices 110 and 120 may provide a chatbot participating chat service by the user's selection, allowing the user to chat while simultaneously viewing the broadcast channels.

According to an embodiment, although viewing real-time broadcast channels 111 and 121 provided with chat rooms 112 and 122 by the service operator, if there are few chat room participants or chat is not active, the display devices 110 and 120 may provide a chatbot participating chat service by the user's selection, thereby providing the user with a right of choice for a chat experience.

According to an embodiment, although viewing real-time broadcast channels 111 and 121 provided with chat rooms 112 and 122 by the service operator, if there are few chat room participants or chat is not active, a server device 500 (refer to FIG. 5) may automatically provide a chatbot participating chat service to all of the display devices 110 and 120 participating in the chat rooms 112 and 122, thereby providing a meaningful, extended chat experience as well as real-time broadcast channel viewing, to the user group viewing the real-time broadcast channels.

According to various embodiments, the display devices 110 and 120 may include user devices capable of various computing functions, such as real-time broadcast channel viewing, chatting, and communication. The display devices 110 and 120 may include, but are not limited to, TVs, desktop computers, smart phones, laptop computers, tablet PCs, mobile phones, personal digital assistants (PDAs), laptops, media players, e-book terminals, digital broadcasting terminals, navigation devices, kiosks, digital cameras, home appliances, and other mobile or non-mobile computing devices. The display devices 110 and 120 may be wearable terminals, such as watches and glasses, capable of performing various computing functions, such as real-time broadcast channel viewing, chatting, and communication. The display devices 110 and 120 may be various types of terminals without being limited to the above examples. A block diagram illustrating an example configuration of the display devices 110 and 120 is described in greater detail below with reference to FIG. 4.

According to various embodiments, the server device 500 may include a computing device capable of performing various computing functions, such as image analysis, chat management, and communication. A block diagram illustrating an example configuration of the server device 500 is described in greater detail below with reference to FIG. 5.

Figure 2:
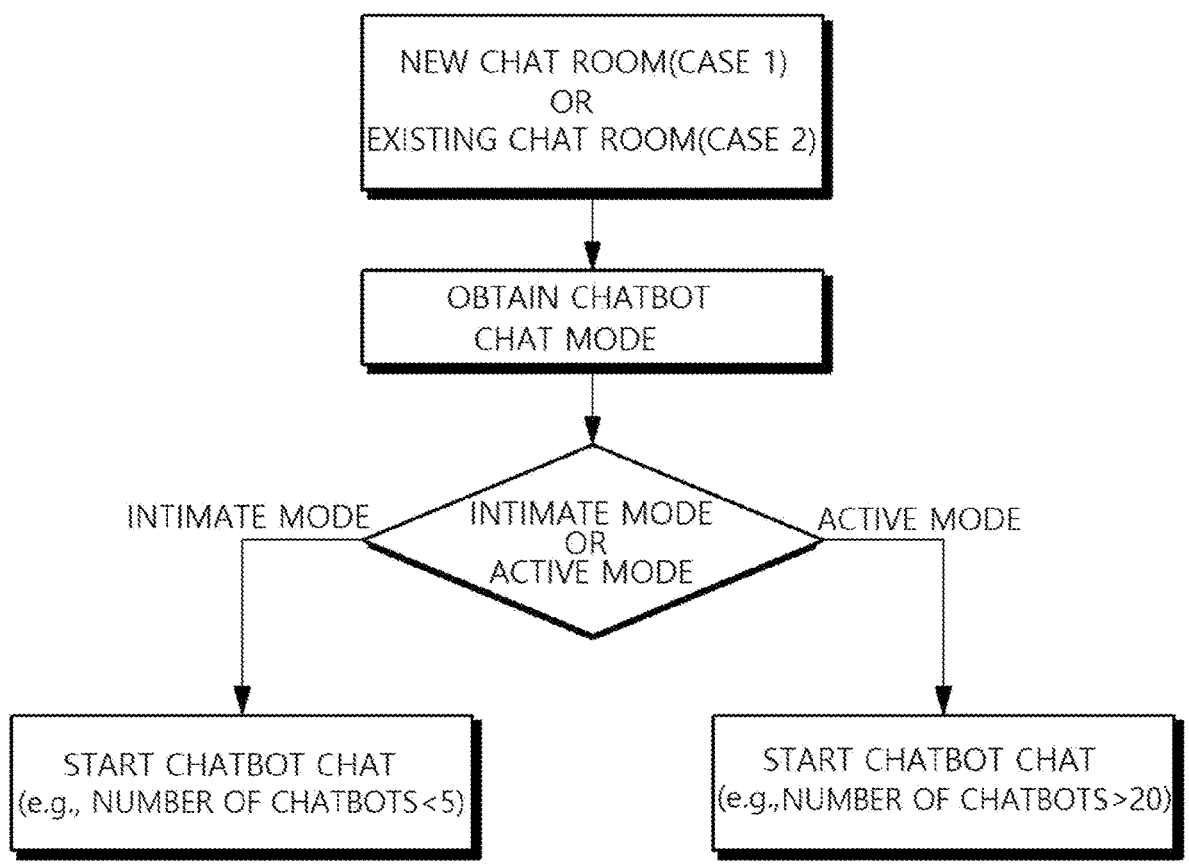
FIG. 2 is a diagram illustrating an example method of providing a chatbot participating chat service on a display device according to various embodiments.

FIG. 2 is a diagram illustrating an example method of providing a chatbot participating chat service on a display device according to various embodiments.

Referring to FIG. 2, the display devices 110 and 120 may provide a chatbot participating chat service based on a user input when viewing, on the display devices 110 and 120, real-time broadcast channels provided with no chat room by the service operator (case 1) or when there are few chat room participants or chat is not active although viewing real-time broadcast channels provided with chat room by the service operator on the display devices 110 and 120 (case 2).

The display devices 110 and 120 may obtain a user input including at least one of a chatbot chat mode and the number of chatbots in the chat rooms corresponding to the real-time broadcast channels. The chatbot chat mode may include an intimate mode and an active mode. The display devices 110 and 120 may determine the number of chatbots in the chat rooms corresponding to the real-time broadcast channels based on the user input. The display devices 110 and 120 may start a chatbot participating chat in a new chat room (case 1) corresponding to the real-time broadcast channel or an existing chat room (case 2), using at least one chatbot corresponding to the number of chatbots. In the shown example, the display devices 110 and 120 may determine that the number of chatbots is a predetermined (e.g., specified) value less than five when the chatbot chat mode is the intimate mode and that the number of chatbots is a predetermined value more than 20 when the chatbot chat mode is the active mode, but it is apparent to one of ordinary skill in the art that the predetermined value may be determined in various manners.

Examples in which the display devices 110 and 120 create a new chatbot participating chat room and provide a chatbot chat are described in greater detail below with reference to FIGS. 6 and 9. Examples in which the display devices 110 and 120 change the existing participating chat room to a chatbot participating chat room and provide a chatbot participating chat are described in greater detail below with reference to FIGS. 7 and 10.

Figure 3:
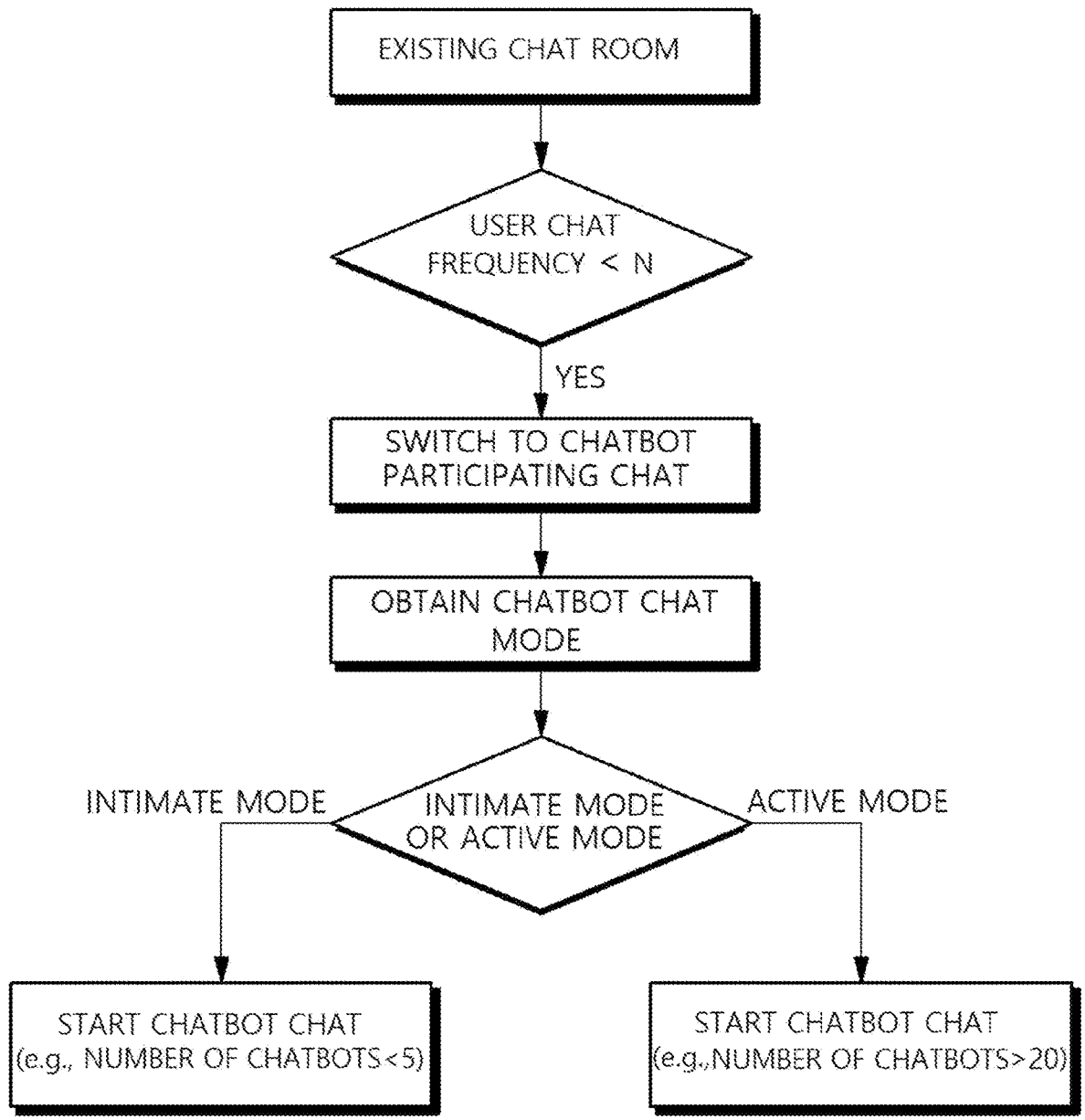
FIG. 3 is a diagram illustrating an example method of providing a chatbot participating chat service on a server device according to various embodiments.

FIG. 3 is a diagram illustrating an example of providing a chatbot participating chat service on a server device according to various embodiments.

Referring to FIG. 3, when there are few chat room participants for the real-time broadcast channel provided with a chat room by the service operator or chat is not active, the server device 500 (refer to FIG. 5) may provide a chatbot participating chat service to at least one display device 110 and 120 participating in the chat room, and the at least one display device 110 and 120 may receive chatbot chat messages from the server device 500 and output them.

The server device 500 may obtain a user chat frequency within a predetermined time for the chat room corresponding to the real-time broadcast channel. When the user chat frequency is less than a predetermined value, the server device 500 may switch the chat room into a chatbot participating chat room.

The server device 500 may obtain the chatbot chat mode of the chat room corresponding to the real-time broadcast channel based on the type of the real-time broadcast channel. The chatbot chat mode may include an intimate mode and an active mode. For example, when the real-time broadcast channel is an audition program, the server device 500 may obtain the active mode as the chatbot chat mode and, when the real-time broadcast channel is a drama program, the server device 500 may obtain the intimate mode as the chatbot chat mode. The server device 500 may determine the number of chatbots based on the chatbot chat mode. The server device 500 may start a chatbot participating chat in the chat room corresponding to the real-time broadcast channel using at least one chatbot corresponding to the number of chatbots. In the shown example, the server device 500 may determine that the number of chatbots is a predetermined value less than five when the chatbot chat mode is the intimate mode and that the number of chatbots is a predetermined value more than 20 when the chatbot chat mode is the active mode, but it is apparent to one of ordinary skill in the art that the predetermined value may be determined in various manners.

Examples in which the server device 500 automatically switches the existing participating chat room to a chatbot participating chat room and provide a chatbot chat are described in greater detail below with reference to FIGS. 8 and 11.

Figure 4:
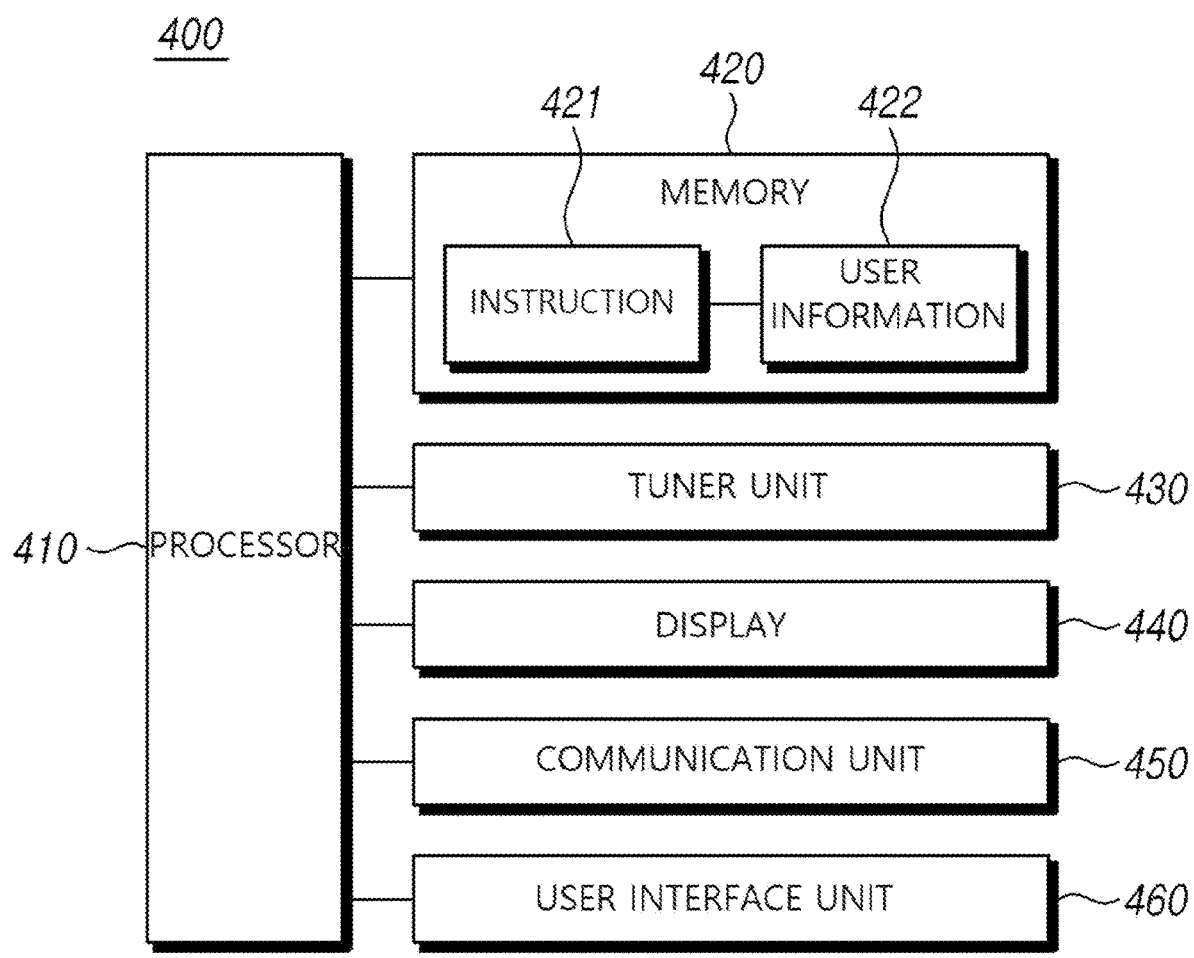
FIG. 4 is a block diagram illustrating an example configuration of a display device according to various embodiments.

FIG. 4 is a block diagram illustrating an example configuration of a display device according to various embodiments.

Referring to FIG. 4, a display device 400 may include a processor (e.g., including processing circuitry) 410, a memory 420, a tuner unit (e.g., including a tuner) 430, a display 440, a communication unit (e.g., including communication circuitry) 450, and a user interface unit (e.g., including interface circuitry) 460. The display device 400 may include additional components in addition to the illustrated components, or may omit at least one of the illustrated components.

According to various embodiments, the display device 400 may include user devices capable of various computing functions, such as real-time broadcast channel viewing, chatting, and communication. The display device 400 may include, but are not limited to, TVs, desktop computers, smart phones, laptop computers, tablet PCs, mobile phones, personal digital assistants (PDAs), laptops, media players, e-book terminals, digital broadcasting terminals, navigation devices, kiosks, digital cameras, home appliances, and other mobile or non-mobile computing devices. The display device 400 may be wearable terminals, such as watches and glasses, capable of performing various computing functions, such as real-time broadcast channel viewing, chatting, and communication. The display device 400 may be various types of terminals without being limited to the above examples.

According to an embodiment, the memory 420 is a storage medium used by the display device 400 and may store data, such as at least one instruction 421 or configuration information corresponding to at least one program. The program may include an operating system (OS) program and various application programs. The memory 420 may be configured as a volatile memory, a non-volatile memory, or a combination of a volatile memory and a non-volatile memory. The memory 420 may provide the stored data according to a request of the processor 410.

According to an embodiment, the memory 420 may store the user information 422 by the processor 410. For example, the user information 422 may include at least one of user preference information and user view history information. The user preference information may include at least one of a preferred image type, a preferred actor, and a preferred team. The user view history information may include at least one of various information about user view images, including the names of images viewed by the user and episode identifiers, and view environment information including view dates.

According to an embodiment, the tuner unit 430 may include a tuner and tune and select only the frequency of the broadcast channel to be received by the display device 400 among many radio components, by amplifying, mixing, and resonating the broadcast signals wiredly/wirelessly received. The broadcast signal may include video, audio, and additional data (e.g., electronic program guide (EPG)). The tuner unit 430 may receive real-time broadcast channels from various broadcast sources, such as terrestrial broadcasts, cable broadcasts, satellite broadcasts, Internet broadcasts, and the like. The tuner unit 430 may be implemented integrally with the display device 400 or as a separate tuner electrically connected to the display device 400.

According to an embodiment, the display 440 may perform functions for outputting information in the form of numbers, characters, images, and/or graphics. The display 440 may include at least one hardware module for output. The at least one hardware module may include at least one of, e.g., a liquid crystal display (LCD), a light emitting diode (LED), a light emitting polymer display (LPD), an organic light emitting diode (OLED), an active matrix organic light emitting diode (AMOLED), or flexible LED (FLED). The display 440 may display a screen corresponding to data received from the processor 410. The display 440 may be referred to as an 'output unit', a 'display unit', or by other terms.

According to an embodiment, the communication unit 450 may include various communication circuitry and provide a communication interface that enables communication with an external device and may include a network interface card and a wireless transmission/reception unit but it is apparent to one of ordinary skill in the art that it is not limited to a specific communication technology. The communication unit 450 may receive a streaming broadcast channel from an image server on the Internet.

According to an embodiment, the user interface unit 460 may include various interface circuitry and detect an input from the user and may provide data corresponding to the detected input to the processor 410. The user interface unit 460 may obtain a user input including at least one of a chatbot chat mode and the number of chatbots in the chat rooms corresponding to the real-time broadcast channels. The user interface unit 460 may obtain a second user input for terminating the chatbot participation in the chat room. The user interface unit 460 may include at least one hardware module for detecting an input from the user. The at least one hardware module may include at least one of, e.g., a sensor, such as an optical sensor, a keyboard, a key pad, a touch pad, or a touch panel. When the user interface unit 460 is implemented as a touch panel, the user interface unit 460 may be coupled with the display 440 to provide a touchscreen.

According to an embodiment, the processor 410 may include various processing circuitry and control at least one other component of the display device 400 and/or execute computation or data processing regarding communication by executing at least one instruction 421 stored in the memory 420. The processor 410 may include at least one of a central processing unit (CPU), a graphic processing unit (GPU), a micro controller unit (MCU), a sensor hub, a supplementary processor, a communication processor, an application processor, an application specific integrated circuit (ASIC), or field programmable gate arrays (FPGA) and may have multiple cores.

According to an embodiment, the processor 410 may determine the number of chatbots in the chat room corresponding to the real-time broadcast channel, based on the user input obtained by the user interface unit 460. The chatbot chat mode may include an intimate mode and an active mode, but it is apparent to one of ordinary skill in the art that the chatbot chat mode may be configured in various ways. The chat room may be a new chat room created by a user input by the display device 400 or a participating existing chat room provided corresponding to the real-time broadcast channel from a user chat server (not shown) operated by the service operator.

According to an embodiment, the processor 410 may associate user information to at least one chatbot corresponding to the number of chatbots, determining a chat character of the at least one chatbot. The processor 410 may enable the at least one chatbot to create a chatbot chat message sharing a common interest with the user by associating information, such as the preferred actor or preferred team included in the user preference information. For example, the processor 410 may enable the at least one chatbot to create a chatbot chat message regarding a specific episode of the video viewed by the user and, when viewing sports game, a chatbot chat message for cheering the team the user is rooting for.

According to an embodiment, the processor 410 may obtain a user chat frequency within a second predetermined time. When the user chat frequency is a first predetermined value or more, the processor 410 may reduce the number of chatbots by the second predetermined value. For example, the processor 410 may obtain a user chat frequency of 7 for one minute and, when the obtained user chat frequency is 3 or more, may reduce the number of chatbots by one. It is apparent to one of ordinary skill in the art that the second predetermined time, the first predetermined value, and the second predetermined value may be set to various values.

According to an embodiment, the processor 410 may determine the chatbot to chat with at a specific time among at least one chatbot corresponding to the number of chatbots. The processor 410 may determine whether there is a user chat within a first predetermined time. When there is no user chat within the first predetermined time, the processor 410 may create a chatbot chat content based on the content of the real-time broadcast channel or previous chat content of the at least one chatbot. When there is a user chat within the first predetermined time, the processor 410 may create a chatbot chat content based on the user chat. It is apparent to one of ordinary skill in the art that the first predetermined time may be set to various values.

According to an embodiment, the processor 410 may create a chatbot chat message based on the chatbot chat content and output the chatbot chat message in the chatbot chat room corresponding to the chatbot chat message, through the display 440. The chatbot chat message may include an emoji, which is a character symbol expressed as a picture, and text. The processor 410 may output the chatbot chat message corresponding to the chat room on the display 440 only when obtaining a user input including at least one of the number of chatbots and the chatbot chat mode through the user interface 460. In other words, when the chat room is an already participating chat room provided corresponding to the real-time broadcast channel from the user chat server operated by the service operator, the chatbot chat message may be output only on at least one display device for which the chatbot chat mode has been set.

According to an embodiment, the processor 410 may terminate the chatbot participation in the chat room based on a second user input to terminate the chatbot participation in the chat room, obtained through the user interface unit 460.

Figure 5:
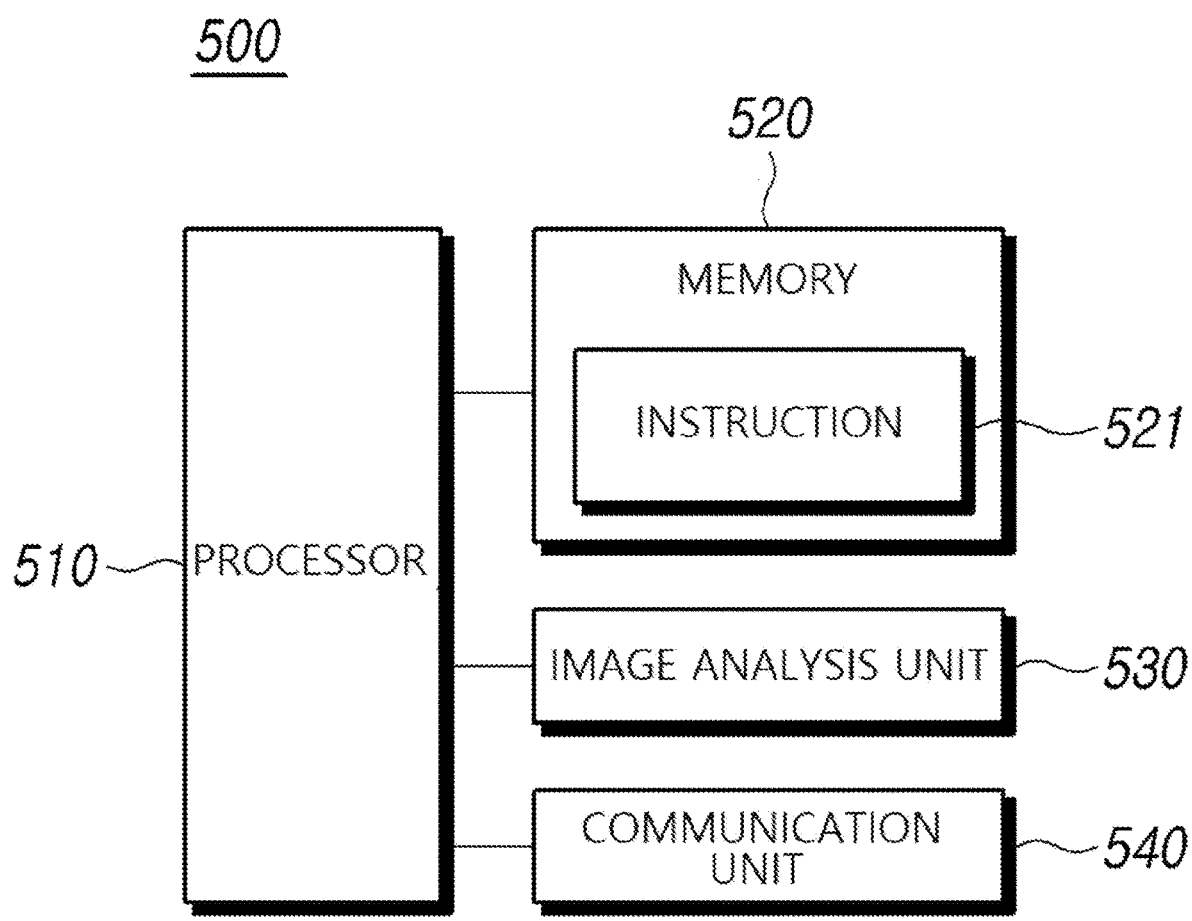
FIG. 5 is a block diagram illustrating an example configuration of a server device according to various embodiments.

FIG. 5 is a block diagram illustrating an example configuration of a server device according to various embodiments.

Referring to FIG. 5, the server device 500 may include a processor (e.g., including processing circuitry) 510, a memory 520, an image analysis unit (e.g., including various circuitry) 530, and a communication unit (e.g., including communication circuitry) 540. The server device 500 may include additional components in addition to the illustrated components, or may omit at least one of the illustrated components. According to an embodiment, the server device 500 may include a computing device capable of performing various computing functions, such as image analysis, chat management, and communication.

According to an embodiment, the memory 520 is a storage medium used by the server device 500 and may store data, such as at least one instruction 521 or configuration information (not shown) corresponding to at least one program. The program may include an operating system (OS) program and various application programs. The memory 520 may be configured as a volatile memory, a non-volatile memory, or a combination of a volatile memory and a non-volatile memory. The memory 520 may provide the stored data according to a request of the processor 510.

According to an embodiment, the image analysis unit 530 may include various circuitry and/or executable program instructions and obtain information related to the real-time broadcast channel from an image server over the Internet through the communication unit 540 and analyze the real-time broadcast channel. The information related to the real-time broadcast channel may include at least one of a scene keyword, a subtitle keyword, and various additional information (or metadata) for the real-time broadcast channel. For example, the image analysis unit 530 may obtain the type of the real-time broadcast channel based on information related to the real-time broadcast channel.

According to an embodiment, the communication unit 540 may include various communication circuitry and provide an interface for communication with, e.g., the image server, the user chat server, or the display device 400. The communication unit 540 may include a network interface card or wireless transmission/reception unit enabling communication through an external network (e.g., a network) but it is apparent to one of ordinary skill in the art that it is not limited to a specific communication technology. The communication unit 540 may perform signal processing for accessing a wireless network. The wireless network may include, e.g., at least one of a wireless LAN or a cellular network (e.g., long-term evolution (LTE)).

According to an embodiment, the processor 510 may include various processing circuitry and control at least one other component of the server device 500 and/or execute computation or data processing regarding communication by executing at least one instruction 521 stored in the memory 520. The processor 510 may include at least one of a central processing unit (CPU), a graphic processing unit (GPU), a micro controller unit (MCU), a sensor hub, a supplementary processor, a communication processor, an application processor, an application specific integrated circuit (ASIC), or field programmable gate arrays (FPGA) and may have multiple cores.

According to an embodiment, the processor 510 may obtain a first user chat frequency within a second predetermined time for the chat room corresponding to the real-time broadcast channel. When the user chat frequency is less than a first predetermined value, the server device 500 may switch the chat room into a chatbot participating chat room. Further, when the first user chat frequency is the first predetermined value or more, the processor 510 may terminate the chatbot participation in the chat room. It is apparent to one of ordinary skill in the art that the second predetermined time and the first predetermined value may be set to various values.

According to an embodiment, the processor 510 may determine the number of chatbots in the chat room corresponding to the real-time broadcast channel, based on the type of the real-time broadcast channel obtained by the image analysis unit 530. Alternatively, the processor 510 may obtain the chatbot chat mode of the chat room corresponding to the real-time broadcast channel based on the type of the real-time broadcast channel and determine the number of chatbots based on the chatbot chat mode. The chatbot chat mode may include an intimate mode and an active mode, but it is apparent to one of ordinary skill in the art that the chatbot chat mode may be configured in various ways.

According to an embodiment, the processor 510 may obtain a second user chat frequency within a third predetermined time. When the second user chat frequency is a second predetermined value or more, the processor 510 may reduce the number of chatbots by the third predetermined value. For example, the processor 510 may obtain a user chat frequency of 7 for one minute and, when the obtained user chat frequency is 3 or more, may reduce the number of chatbots by one. It is apparent to one of ordinary skill in the art that the third predetermined time, the second predetermined value, and the third predetermined value may be set to various values.

According to an embodiment, the processor 510 may determine the chatbot to chat with at a specific time among at least one chatbot corresponding to the number of chatbots. The processor 510 may control the communication unit 540 to determine whether there is a user chat received within a first predetermined time. When there is no user chat within the first predetermined time, the processor 510 may create a chatbot chat content based on the content of the real-time broadcast channel or previous chat content of the at least one chatbot. When there is a user chat within the first predetermined time, the processor 510 may create a chatbot chat content based on the user chat.

According to an embodiment, the processor 510 may generate a chatbot chat message based on the chatbot chat content. The chatbot chat message may include an emoji, which is a character symbol expressed as a picture, and text. The processor 510 may control the communication unit 540 to transmit the chatbot chat message to all of the display devices 400 participating in the chat room.

Figure 6:
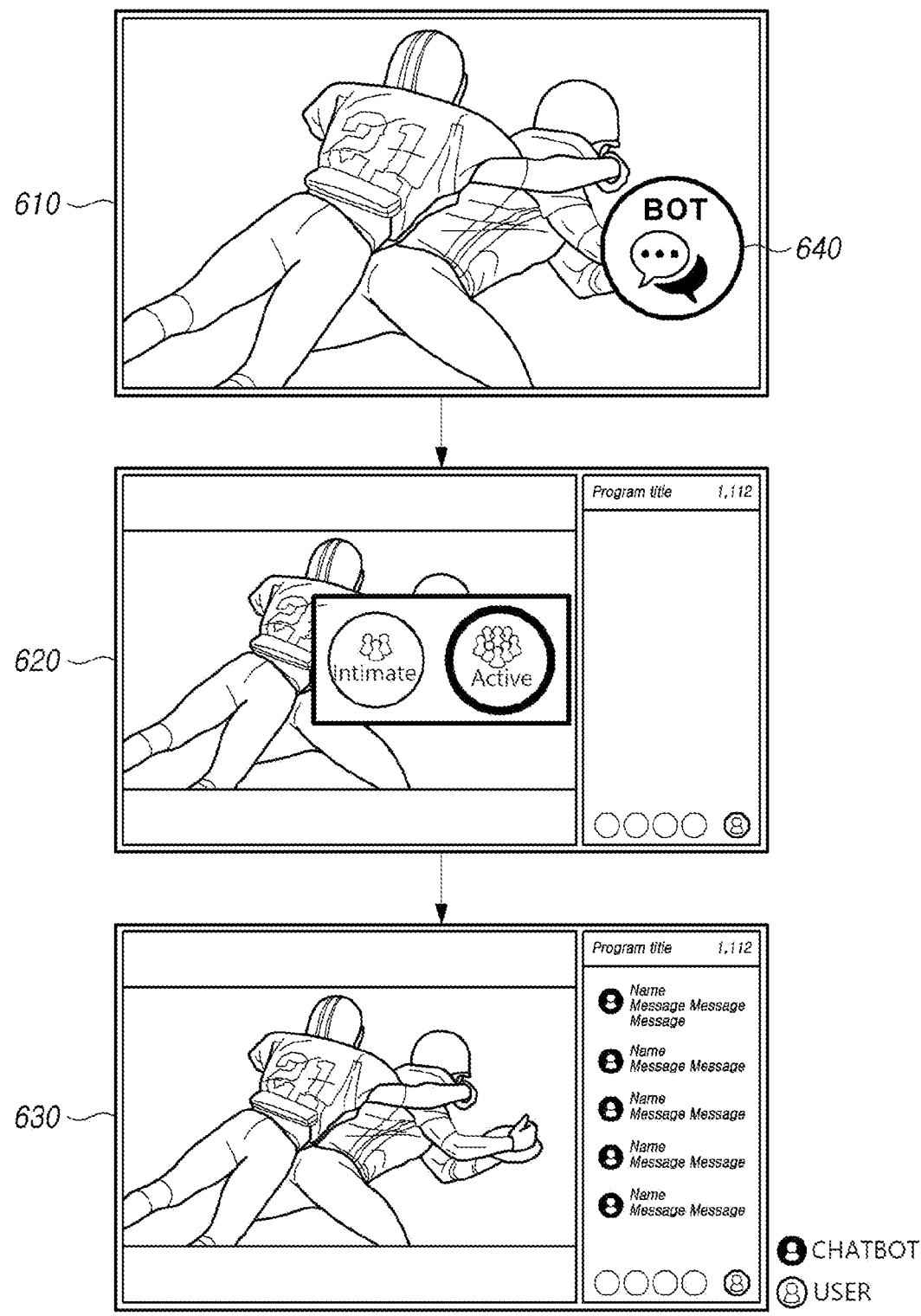
FIG. 6 is a diagram illustrating an example of creating a new chatbot participating chat room on a display device according to various embodiments.

FIG. 6 is a diagram illustrating an example of creating a new chatbot participating chat room on a display device according to various embodiments.

Referring to FIG. 6, the display device 400 (refer to FIG. 4) may provide a user interface (UI) for creating a new chatbot participating chat room corresponding to the real-time broadcast channel (610). In the illustrated example, when the user inputs a selection of the 'BOT' emoticon 640, the display device 400 may create a new chatbot participating chat room corresponding to the real-time broadcast channel. The user interface capable of creating a new chatbot participating chat room may set output ON/OFF through a separate settings UI.

The display device 400 may obtain a user input including at least one of a chatbot chat mode and the number of chatbots in the chat rooms corresponding to the real-time broadcast channels (620). In the illustrated example, as the chatbot chat mode, the intimate mode and the active mode may be output and, based on a user input, the display device 400 may obtain the active mode as the chatbot chat mode.

The display device 400 may determine the number of chatbots based on the chatbot chat mode, provide a chat room including the user and at least one chatbot corresponding to the number of chatbots, and provide a chatbot participating chat through the chat room (630).

Figure 7:
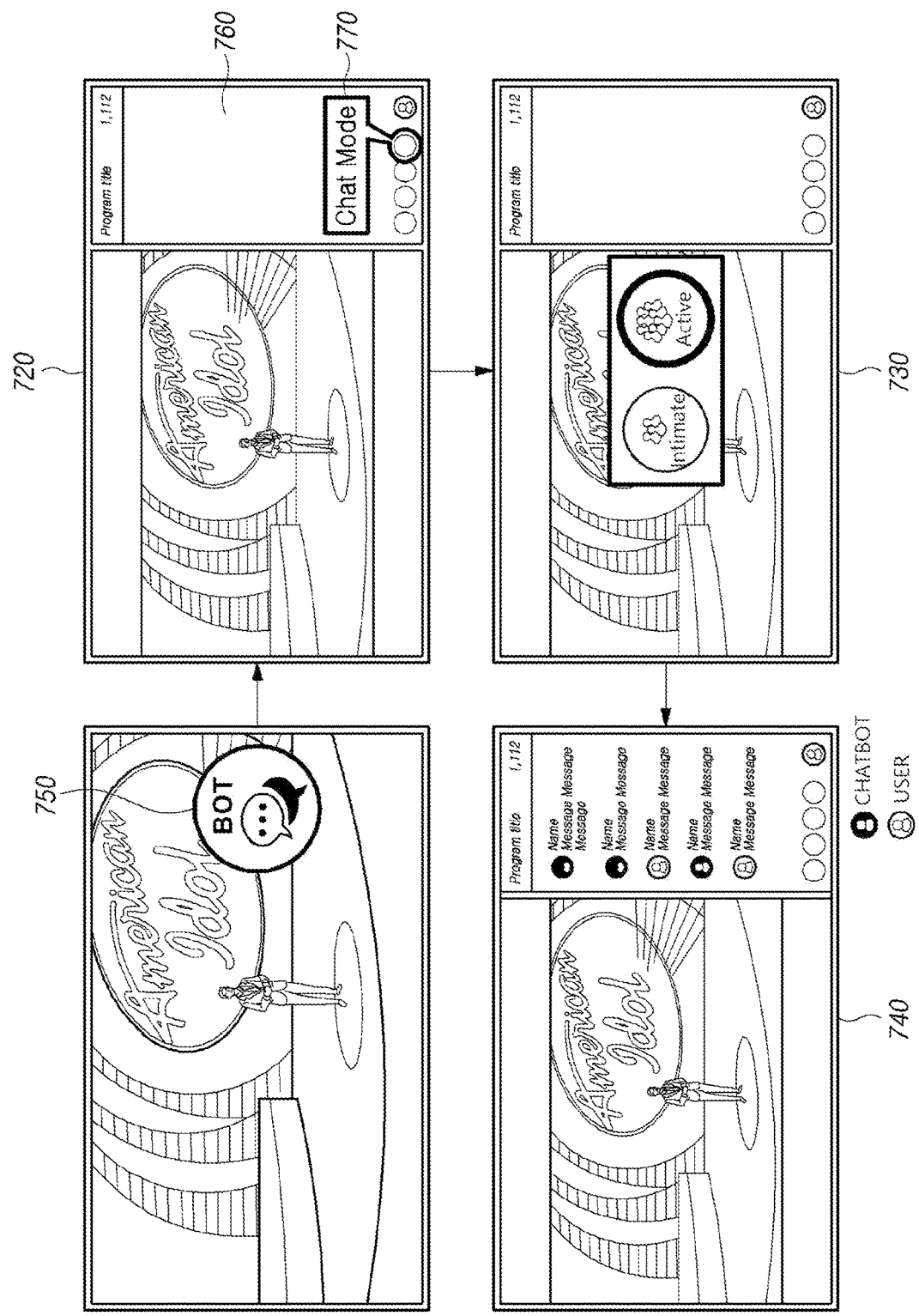
FIG. 7 is a diagram illustrating an example of changing an existing participating chat room to a chatbot participating chat room on a display device according to various embodiments.

FIG. 7 is a diagram illustrating an example of changing an existing participating chat room to a chatbot participating chat room on a display device according to various embodiments.

Referring to FIG. 7, when there is a chat room provided corresponding to the real-time broadcast channel from the user chat server (not shown) operated by the service operator, the display device 400 may display a user interface (UI) to inform the user of it (750). The user interface may set output ON/OFF through a separate settings UI.

In the illustrated example, when the user inputs a selection of the chat room emoticon 750, the display device 400 may output a chat room corresponding to the real-time broadcast channel in a partial area 760 of the display screen (720).

The display device 400 may obtain a user input including at least one of a chatbot chat mode and the number of chatbots in the chat rooms corresponding to the real-time broadcast channels (770 and 730). In the illustrated example, as the chatbot chat mode, the intimate mode and the active mode may be output and, based on a user input, the display device 400 may obtain the active mode as the chatbot chat mode (730). When the display device 400 obtains the chatbot chat mode, the display device 400 may switch the already participating chat room to the chatbot participating chat room.

The display device 400 may determine the number of chatbots based on the chatbot chat mode, provide a chatbot participating chat room including at least one user and at least one chatbot corresponding to the number of chatbots, and provide a chatbot participating chat through the chat room (740). The chatbot chat message may be output only on the display device for which the chatbot chat mode has been set.

Figure 8:
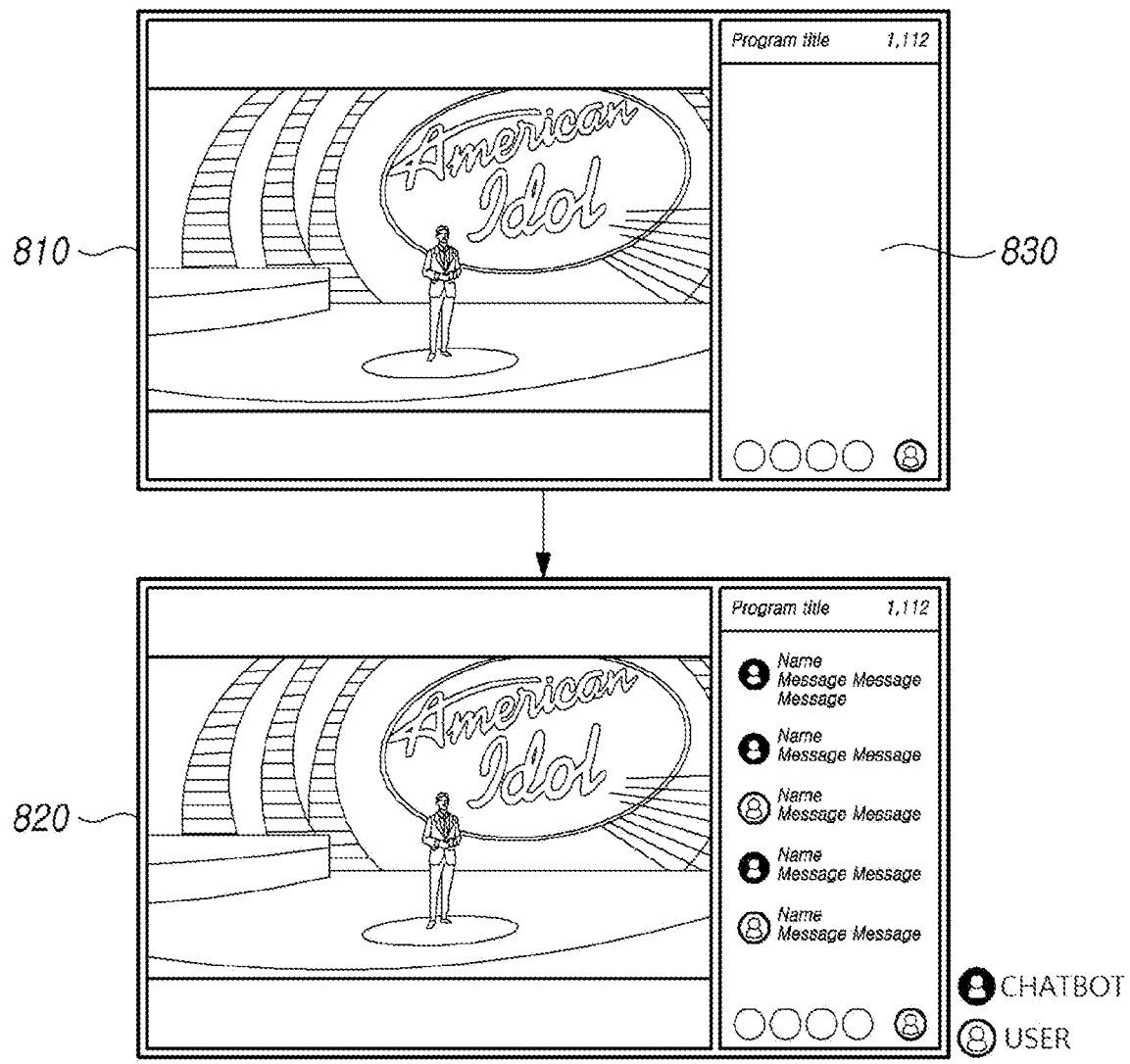
FIG. 8 is a diagram illustrating an example of automatically switching an existing participating chat room to a chatbot participating chat room on a server device according to various embodiments.

FIG. 8 is a diagram illustrating an example of automatically switching an existing participating chat room to a chatbot participating chat room on a server device according to various embodiments.

Referring to FIG. 8, when there is a chat room provided corresponding to the real-time broadcast channel from the user chat server (not shown) operated by the service operator, the display device 400 may output the chat room corresponding to the real-time broadcast channel in a partial area 830 of the display screen 810.

The server device 500 may obtain a first user chat frequency within a second predetermined time for the chat room corresponding to the real-time broadcast channel. When the user chat frequency is less than a first predetermined value, the server device 500 may automatically switch the chat room into a chatbot participating chat room.

The server device 500 may automatically obtain the chatbot chat mode of the chat room corresponding to the real-time broadcast channel based on the type of the real-time broadcast channel. The chatbot chat mode may include an intimate mode and an active mode. In the illustrated example, the server device 500 may obtain the active mode as the chatbot chatting mode since the real-time broadcast channel is an audition program. The server device 500 may determine the number of chatbots based on the chatbot chat mode. The server device 500 may start a chatbot participating chat in the chat room corresponding to the real-time broadcast channel using at least one chatbot corresponding to the number of chatbots. In the illustrated example, since the chatbot chat mode is the active mode, the server device 500 may determine that the number of chatbots is a predetermined value more than 20, but it is apparent to one of ordinary skill in the art that the predetermined value is set to various values. The server device 500 may provide a chatbot participating chat room including the at least one chatbot and at least one user to all of the display devices 400 participating in the chat room. Each display device 400 participating in the chat room may output the chatbot chat message created by the server device 500 on the display (820).

Figure 9:
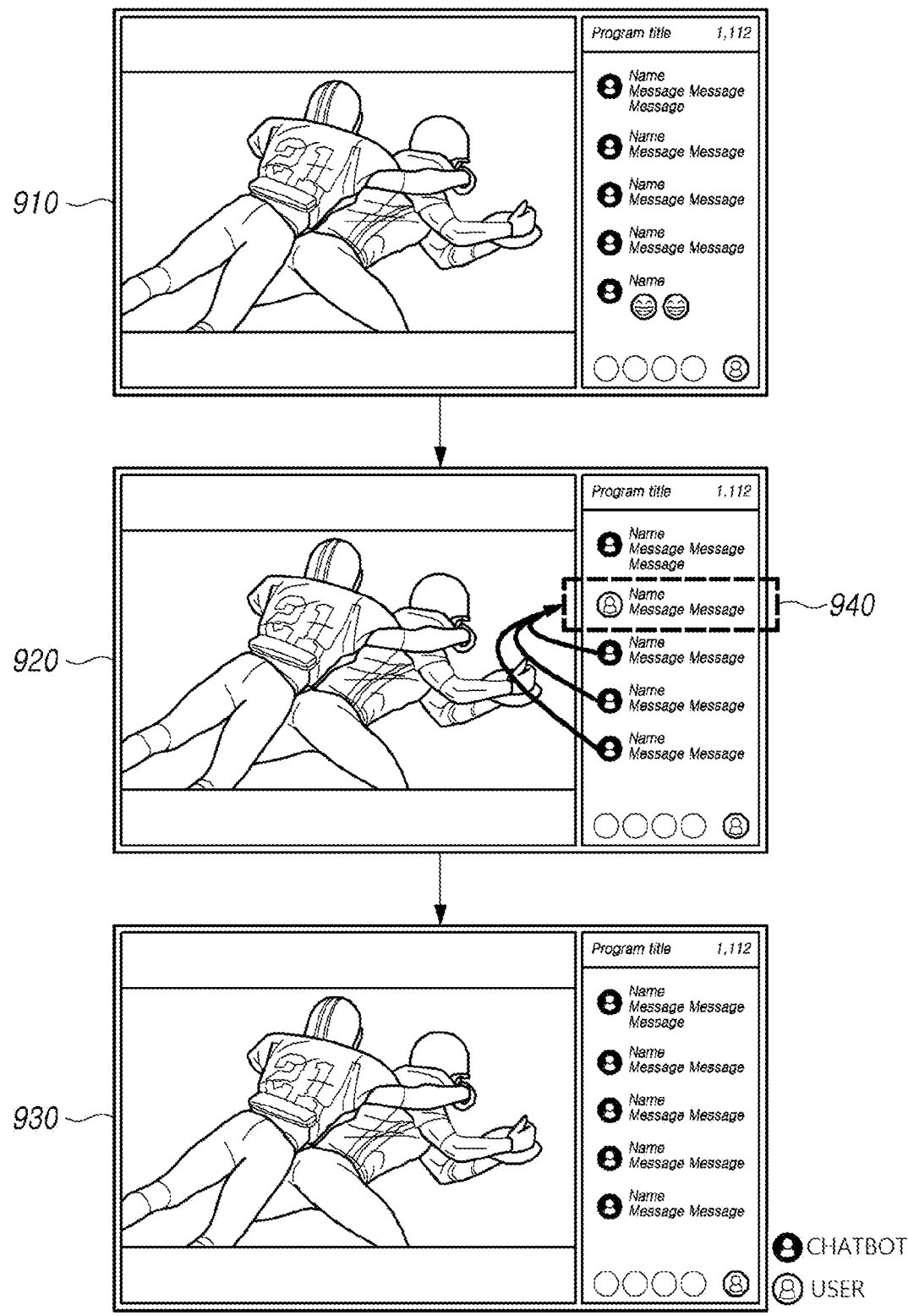
FIG. 9 is a diagram illustrating an example of a chatbot chat in a created new chatbot participating chat room on a display device described above in connection with FIG. 6 according to various embodiments.

FIG. 9 is a diagram illustrating an example of a chatbot chat in a created new chatbot participating chat room on a display device described above in connection with FIG. 6 according to various embodiments.

Referring to FIG. 9, the display device 400 may determine the chatbot to chat with at a specific time among at least one chatbot. The display device 400 may determine whether there is a user chat within a predetermined time. When there is no user chat within the predetermined time, the display device 400 may create a chatbot chat content based on the content of the real-time broadcast channel or previous chat content of the at least one chatbot (910 and 930).

In the illustrated example, if there is a user chat 940 within the predetermined time, the display device 400 may create chatbot chat content first based on the user chat 940 (920).

In the illustrated example, the display device 400 may create a chatbot chat message based on the chatbot chat content and output the chatbot chat message in the chatbot room corresponding to the chatbot chat message, through the display 440. The chatbot chat message may include an emoji, which is a character symbol expressed as a picture, and text.

The display device 400 may enable the at least one chatbot to create a chatbot chat message sharing a common interest with the user by associating information, such as the preferred actor or preferred team included in the user preference information.

Figure 10:
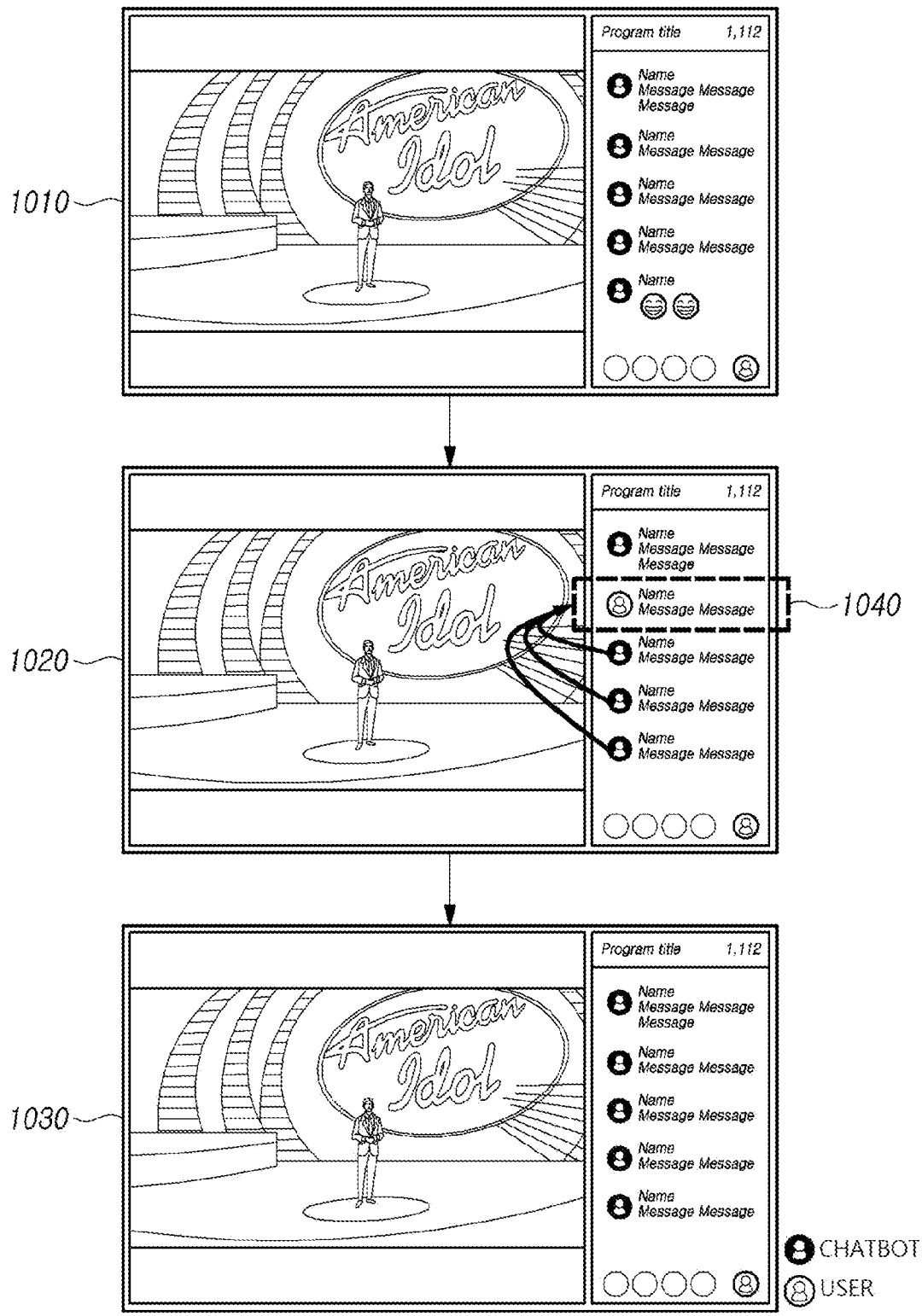
FIG. 10 is a diagram illustrating an example of a chatbot chat in a changed chatbot participating chat room on a display device described above in connection with FIG. 7 according to various embodiments.

FIG. 10 is a diagram illustrating an example of a chatbot chat in a changed chatbot participating chat room on a display device described above in connection with FIG. 7 according to various embodiments.

Referring to FIG. 10, the display device 400 may determine the chatbot to chat with at a specific time among at least one chatbot. The display device 400 may determine whether there is a user chat within a predetermined time. When there is no user chat within the predetermined time, the display device 400 may create a chatbot chat content based on the content of the real-time broadcast channel or previous chat content of the at least one chatbot (1010 and 1030).

In the illustrated example, if there is a user chat 1040 within the predetermined time, the display device 400 may create chatbot chat content first based on the user chat 1040 (1020).

In the illustrated example, the display device 400 may create a chatbot chat message based on the chatbot chat content and output the chatbot chat message in the chatbot room corresponding to the chatbot chat message, through the display 440. The chatbot chat message may include an emoji, which is a character symbol expressed as a picture, and text. The chatbot chat message may be output only on the display device for which the chatbot chat mode has been set.

The display device 400 may enable the at least one chatbot to create a chatbot chat message sharing a common interest with the user by associating information, such as the preferred actor or preferred team included in the user preference information.

The display device 400 may obtain a user chat frequency within a predetermined time. When the user chat frequency is a first predetermined value or more, the display device 400 may automatically reduce the number of chatbots by the second predetermined value.

Figure 11:
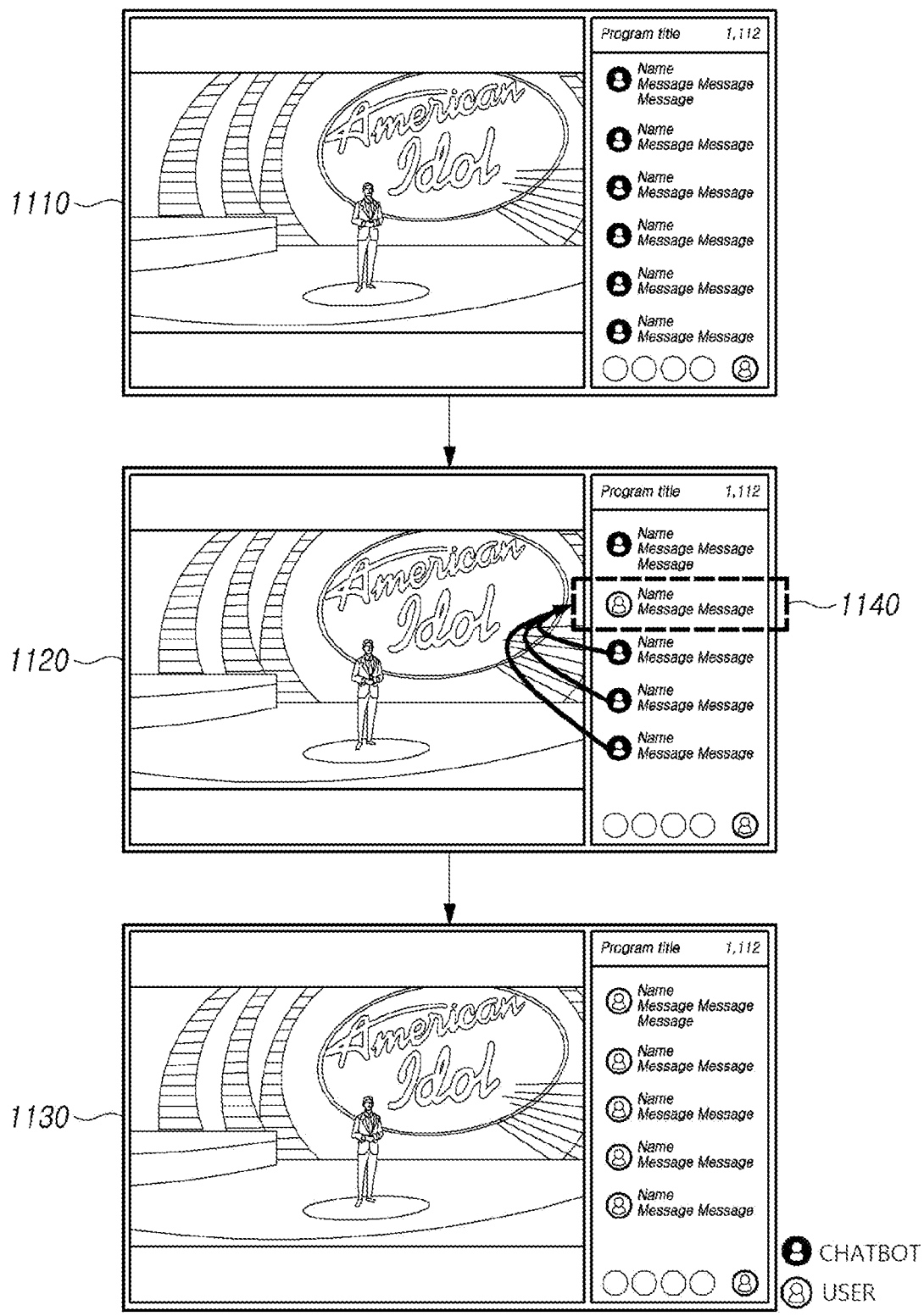
FIG. 11 is a diagram illustrating an example of a chatbot chat in an automatically switched chatbot participating chat room on a server device described above in connection with FIG. 8 according to various embodiments.

FIG. 11 is a diagram illustrating an example of a chatbot chat in an automatically switched chatbot participating chat room on a server device described above in connection with FIG. 8 according to various embodiments.

Referring to FIG. 11, the server device 500 may determine the chatbot to chat with at a specific time among at least one chatbot. The server device 500 may determine whether there is a user chat within a predetermined time. When there is no user chat within the predetermined time, the server device 500 may create a chatbot chat content based on the content of the real-time broadcast channel or previous chat content of the at least one chatbot and provide it to all of the display devices participating in the chat room (1110).

In the illustrated example, if there is a user chat 1140 within the predetermined time, the server device 500 may create chatbot chat content first based on the user chat 1140 (1120).

In the illustrated example, the server device 500 may create a chatbot chat message based on the chatbot chat content and transmit it to all of the display devices participating in the chat room. The chatbot chat message may include an emoji, which is a character symbol expressed as a picture, and text. The chatbot chat message may be output on all of the display devices participating in the chat room (1110 and 1120).

The server device 500 may obtain a second user chat frequency within a third predetermined time. When the second user chat frequency is a second predetermined value or more, the processor 510 may reduce the number of chatbots by the third predetermined value. In the illustrated example, it may be identified that the number of chatbots is reduced to 0 because user chat is frequent (1130).

Figure 12:
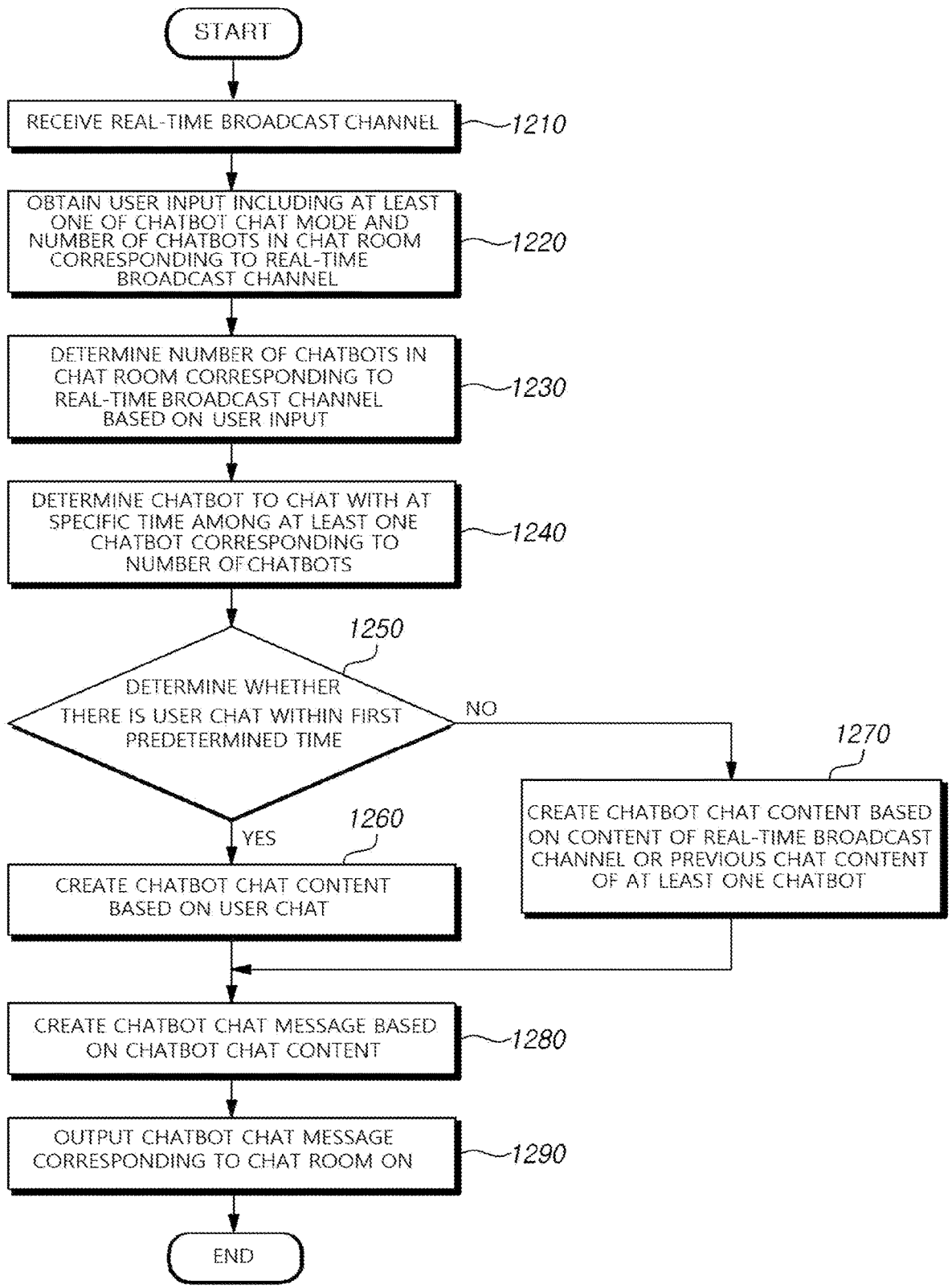
FIG. 12 is a flowchart illustrating an example method for providing a chatbot participating chat service by a display device according to various embodiments.

FIG. 12 is a flowchart illustrating an example method for providing a chatbot participating chat service by a display device according to various embodiments.

Referring to FIG. 12, according to an embodiment, in operation 1210, the display device 400 may control the tuner unit 430 or the communication unit 450 to receive a real-time broadcast channel.

According to an embodiment, in operation 1220, the display device 400 may obtain a user input including at least one of a chatbot chat mode and the number of chatbots in the chat rooms corresponding to the real-time broadcast channels. The chatbot chat mode may include an intimate mode and an active mode. The chat room may be a new chat room created based on a user input on the display device 400 or may be an already participating chat room provided corresponding to the real-time broadcast channel from the user chat server operated by the service operator.

According to an embodiment, in operation 1230, the display device 400 may determine the number of chatbots in the chat rooms corresponding to the real-time broadcast channels based on the user input. The display device 400 may associate user information to at least one chatbot corresponding to the number of chatbots, determining a chat character of the at least one chatbot. The user information may include at least one of user preference information and user view history information. The user preference information may include at least one of a preferred image type, a preferred actor, and a preferred team. The user view history information may include at least one of various information about user view images, including the names of images viewed by the user and episode identifiers, and view environment information including view dates.

According to an embodiment, the display device 400 may obtain a user chat frequency within a second predetermined time. When the user chat frequency is a first predetermined value or more, the processor 410 may reduce the number of chatbots by the second predetermined value. It is apparent to one of ordinary skill in the art that the second predetermined time, the first predetermined time, and the second predetermined value may be set to various values.

According to an embodiment, in operation 1240, the display device 400 may determine the chatbot to chat with at a specific time among at least one chatbot corresponding to the number of chatbots.

According to an embodiment, in operation 1250, the display device 400 may determine whether there is a user chat within a first predetermined time. When there is a user chat, operation 1260 may be performed and, when there is no user chat, operation 1270 may be performed.

According to an embodiment, in operation 1260, the display device 400 may create a chatbot chat content based on the user chat.

According to an embodiment, in operation 1270, the display device 400 may create a chatbot chat content based on the content of the real-time broadcast channel or previous chat content of the at least one chatbot.

According to an embodiment, in operation 1280, the display device 400 may generate or create a chatbot chat message based on the chatbot chat content. The chatbot chat message may include an emoji and text.

According to an embodiment, in operation 1290, the display device 400 may output the chatbot chat message corresponding to the chat room on the display 440. The display device 400 may output the chatbot chat message corresponding to the chat room on the display 440 only when obtaining the chatbot chat mode based on an external input.

According to an embodiment, the display device 400 may terminate the chatbot participation in the chat room based on a user input.

Figure 13:
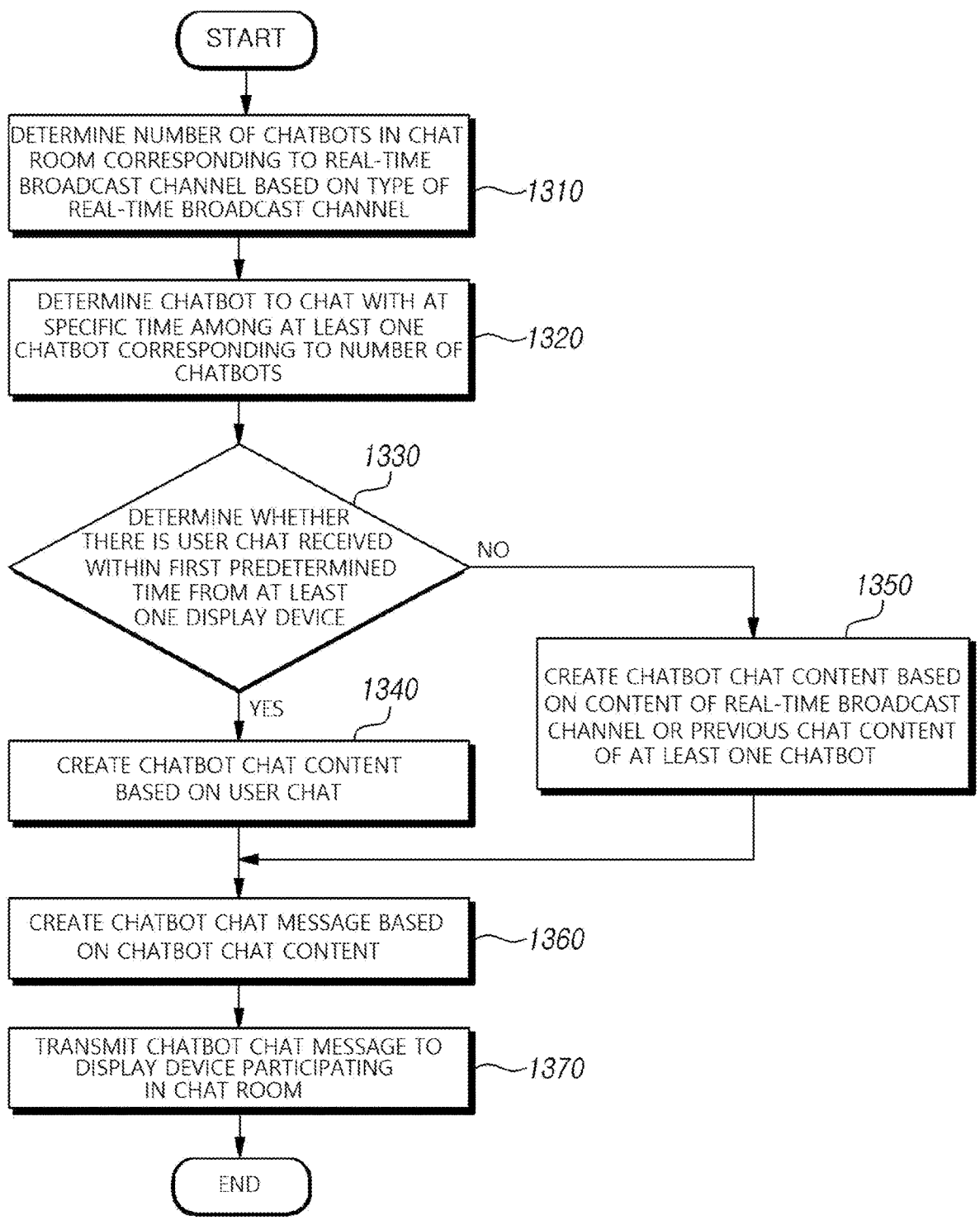
FIG. 13 is a flowchart illustrating an example method for providing a chatbot participating chat service by a server device according to various embodiments.

FIG. 13 is a flowchart illustrating an example method for providing a chatbot participating chat service by a server device according to various embodiments.

According to an embodiment, the server device 500 may obtain information related to the real-time broadcast channel from an image server over the Internet and analyze the real-time broadcast channel. The information related to the real-time broadcast channel may include a scene keyword, a subtitle keyword, and various additional information (or metadata) for the real-time broadcast channel. For example, the server device 500 may obtain the type of the real-time broadcast channel based on information related to the real-time broadcast channel.

According to an embodiment, the server device 500 may obtain a first user chat frequency within a second predetermined time for the chat room corresponding to the real-time broadcast channel. When the user chat frequency is less than a first predetermined value, the server device 500 may switch the chat room into a chatbot participating chat room. Further, when the first user chat frequency is the first predetermined value or more, the server device 500 may terminate the chatbot participation in the chat room. It is apparent to one of ordinary skill in the art that the second predetermined time and the first predetermined value may be set to various values.

Referring to FIG. 13, according to an embodiment, in operation 1310, the server device 500 may determine the number of chatbots in the chat room corresponding to the real-time broadcast channel based on the type of the real-time broadcast channel. Alternatively, the server device 500 may obtain the chatbot chat mode of the chat room corresponding to the real-time broadcast channel based on the type of the real-time broadcast channel and determine the number of chatbots based on the chatbot chat mode. The chatbot chat mode may include an intimate mode and an active mode. According to an embodiment, the server device 500 may obtain a second user chat frequency within a third predetermined time. When the second user chat frequency is a second predetermined value or more, the processor 510 may reduce the number of chatbots by the third predetermined value. It is apparent to one of ordinary skill in the art that the third predetermined time, the second predetermined value, and the third predetermined value may be set to various values.

According to an embodiment, in operation 1320, the server device 500 may determine the chatbot to chat with at a specific time among at least one chatbot corresponding to the number of chatbots.

According to an embodiment, in operation 1330, the server device 500 may determine whether there is a user chat received within a first predetermined time from at least one display device participating in the chat room. When there is a user chat, operation 1340 may be performed and, when there is no user chat, operation 1350 may be performed.

According to an embodiment, in operation 1340, the server device 500 may create a chatbot chat content based on the user chat.

According to an embodiment, in operation 1350, the server device 500 may create a chatbot chat content based on the content of the real-time broadcast channel or previous chat content of the at least one chatbot.

According to an embodiment, in operation 1360, the server device 500 may generate or create a chatbot chat message based on the chatbot chat content. The chatbot chat message may include an emoji and text.

According to an embodiment, in operation 1370, the server device 500 may transmit the chatbot chat message to the at least one display device participating in the chat room.

The program executed by the display device 400 and the server device 500 described herein may be implemented as a hardware component, a software component, and/or a combination thereof. The program may be executed by any system capable of executing computer readable instructions.

The software may include computer programs, codes, instructions, or combinations of one or more thereof and may configure the processing device as it is operated as desired or may instruct the processing device independently or collectively. The software may be implemented as a computer program including instructions stored in computer-readable storage media. The computer-readable recording media may include, e.g., magnetic storage media (e.g., read-only memory (ROM), random-access memory (RAM), floppy disk, hard disk, etc.) and an optically readable media (e.g., CD-ROM or digital versatile disc (DVD). Further, the computer-readable recording media may be distributed to computer systems connected via a network, and computer-readable codes may be stored and executed in a distributed manner. The media may be read by a computer, stored in a memory, and executed by a processor.

The computer-readable storage medium may be provided in the form of a non-transitory storage medium. Here, the "non-transitory" storage medium may not include a signal and is tangible, but this term does not differentiate between where data is semipermanently stored in the storage medium and where data is temporarily stored in the storage medium.

According to embodiments of the disclosure, the program may be included and provided in a computer program product. The computer program products may be traded as commodities between sellers and buyers. The computer program products may include software programs or computer-readable storage media storing the software programs. For example, the computer program products may include software program-type products (e.g., downloadable applications (apps)) that are electronically distributed through manufacturers of electronic devices or electronic markets (e.g., Google Play Store or App Store). For electronic distribution, at least part of the software programs may be stored in storage media or temporarily generated. In this case, the storage media may be storage media of relay servers that temporarily store the software programs, servers of electronic markets, or servers of manufacturers.

The computer program product may include a storage medium of a server or a storage medium of a device in a system including the server and the device. Alternatively, when there is a third device (e.g., a smart phone) that is communicatively connected to the server or device, the computer program product may include a storage medium of the third device. Alternatively, the computer program product may include the software program itself transmitted from the server to the device or the third device, or transmitted from the third device to the device. In this case, one of the server, the device, and the third device may execute the computer program product to perform the method according to the disclosed embodiments. Alternatively, two or more of the server, the device, and the third device may execute the computer program product to distributively implement the method according to the disclosed embodiments. For example, the server may execute the computer program product stored in the server to control the device communicatively connected with the server to perform the method according to the disclosed embodiments. As another example, the third device may execute the computer program product to control the device communicatively connected to the third device to perform the method according to the disclosed embodiment. When the third device executes the computer program product, the third device may download the computer program product from the server and execute the downloaded computer program product. Alternatively, the third device may execute the computer program product provided in a pre-loaded state to perform the method according to the disclosed embodiments.

While the disclosure is illustrated and described with reference to various example embodiments, it will be understood that the various example embodiments are intended to be illustrative, not limiting. It will be further appreciated by one of ordinary skill in the art that various changes or modifications may be made without departing from the scope of the disclosure including the appended claims and their equivalents. For example, although the techniques described herein are performed in a different order from those described herein and/or the components of the above-described computer system or modules are coupled, combined, or assembled in a different form from those described herein, or some components are replaced with other components or equivalents thereof, a proper result may be achieved. It will also be understood that any of the embodiment(s) described herein may be used in conjunction with any other embodiment(s) described herein.

What is claimed is:

1. A display device, comprising:
   a display;
   a memory storing at least one instruction;
   a tuner unit comprising a tuner configured to receive a real-time broadcast channel;
   a user interface configured to receive an input including at least one of a chatbot chat mode and a number of chatbots in a chat room corresponding to the real-time broadcast channel; and
   one or more processors electrically connected with the display, the memory, the tuner unit, and the user interface and configured to execute the at least one instruction,
   wherein the one or more processors is configured to:
   determine the number of chatbots in the chat room corresponding to the real-time broadcast channel based on the input, determine a chatbot to chat with at a specific time among at least one chatbot corresponding to the number of chatbots,
determine whether there is a user chat within a first specified time,
based on there being no user chat within the first specified time, create a chatbot chat content based on a content of the real-time broadcast channel or a previous chat content of the at least one chatbot,
based on there being the user chat within the first specified time, create the chatbot chat content based on the user chat,
create a chatbot chat message based on the chatbot chat content, and
output the chatbot chat message corresponding to the chat room on the display.

2. The display device of claim 1, wherein the one or more processors are configured to:
obtain a user chat frequency within a second specified time, and
based on the user chat frequency being a first specified value or more, reduce the number of chatbots by a second specified value.

3. The display device of claim 1, wherein the one or more processors are configured to store user information in the memory,
wherein the user information includes at least one of user preference information and user view history information, and
wherein the user preference information includes at least one of a preferred image type, a preferred actor, and a preferred team.

4. The display device of claim 3, wherein the one or more processors are configured to determine a chat character of the at least one chatbot by associating the user information to at least one chatbot corresponding to the number of chatbots.

5. The display device of claim 1, wherein the one or more processors are configured to output the chatbot chat message corresponding to the chat room on the display based on obtaining the input including at least one of the chatbot chat mode and the number of chatbots through the user interface.

6. The display device of claim 1, wherein the user interface is configured to obtain a second input to terminate chatbot participation in the chat room, and
wherein the one or more processors are configured to terminate the chatbot participation in the chat room based on the second input.

7. A display device, comprising:
a display;
a memory storing at least one instruction;
a tuner unit comprising a tuner configured to receive a real-time broadcast channel;
a user interface configured to receive an input including at least one of a chatbot chat mode and a number of chatbots in a chat room corresponding to the real-time broadcast channel; and
one or more processors electrically connected with the display, the memory, the tuner unit, and the user interface and configured to execute the at least one instruction,
wherein the one or more processors is configured to:
determine the number of chatbots in the chat room corresponding to the real-time broadcast channel based on the input,
obtain a user chat frequency within a specified time, and
based on the user chat frequency being a first specified value or more, reduce the number of chatbots by a second specified value.

8. The display device of claim 1, wherein the chatbot chat mode includes an intimate mode and an active mode.

9. The display device of claim 1, wherein the chatbot chat message includes an emoji and text.

10. A method for providing a chatbot participating chat service, the method comprising:
receiving a real-time broadcast channel;
obtaining an input including at least one of a chatbot chat mode and a number of chatbots in a chat room corresponding to the real-time broadcast channel;
determining the number of chatbots in the chat room corresponding to the real-time broadcast channel based on the input;
determining a chatbot to chat with at a specific time among at least one chatbot corresponding to the number of chatbots;
determining whether there is a user chat within a first specified time;
based on there being no user chat within the first specified time, creating a chatbot chat content based on a content of the real-time broadcast channel or a previous chat content of the at least one chatbot;
based on there being the user chat within the first specified time, creating the chatbot chat content based on the user chat;
creating a chatbot chat message based on the chatbot chat content; and
outputting the chatbot chat message corresponding to the chat room on a display.

11. The method of claim 10, further comprising:
obtaining a user chat frequency within a second specified time; and
based on the user chat frequency being a first specified value or more, reducing the number of chatbots by a second specified value.

12. The method of claim 10, further comprising storing user information in a memory,
wherein the user information includes at least one of user preference information and user view history information, and
wherein the user preference information includes at least one of a preferred image type, a preferred actor, and a preferred team.

13. The method of claim 12, further comprising determining a chat character of the at least one chatbot by associating the user information to at least one chatbot corresponding to the number of chatbots.

14. The method of claim 11, wherein outputting the chatbot chat message on the display includes outputting the chatbot chat message corresponding to the chat room on the display based on obtaining the input including at least one of the chatbot chat mode and the number of chatbots in the chat room.

15. The method of claim 10, further comprising:
obtaining a second input to terminate chatbot participation in the chat room; and
terminating the chatbot participation in the chat room based on the second input.

16. A method for providing a chatbot participating chat service, the method comprising:
receiving a real-time broadcast channel;
obtaining an input including at least one of a chatbot chat mode and a number of chatbots in a chat room corresponding to the real-time broadcast channel;

determining the number of chatbots in the chat room corresponding to the real-time broadcast channel based on the input;
obtaining a user chat frequency within a specified time; and
based on the user chat frequency being a first specified value or more, reducing the number of chatbots by a second specified value.

17. The method of claim 10, wherein the chatbot chat mode includes an intimate mode and an active mode.

18. The method of claim 10, wherein the chatbot chat message includes an emoji and text.

* * * * *